Patented Dec. 31, 1940

2,226,771

UNITED STATES PATENT OFFICE 2,226,771

AGE RESISTING RUBBER COMPOSITION

Joseph R. Ingram, Nitro, W. Va., assignor to Monsanto Chemical Company, St. Louis, Mo., a corporation of Delaware No Drawing. Application July 8, 1937,
Serial No. 152,618

14 Claims. (Cl. 260—802)

The present invention relates to the art of rubber manufacture, and particularly relates to the preparation of rubber compositions which resist deterioration due to aging or to exposure to the atmosphere. It has along been known that such deterioration can be greatly retarded by treating the rubber before or after vulcanization with certain substances known as age-resisters or antioxidants. One object of this invention is to provide a superior class of antioxidants for rubber. A further object of this invention is to provide a class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending upon the condition of the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises more particularly treating rubber with a reaction product of an amino substituted diaryl ether and a ketone whereby a rubber product possessing improved flexing and aging properties is obtained.

Specfiic examples of the reaction product of an amino substituted diaryl ether and a ketone are the reaction product of 4 amino 4' methyl diphenyl ether and acetone, the reaction product of 2 amino diphenyl ether and methyl ethyl ketone, the reaction product of 4 amino phenyl α naphthyl ether and acetone, the reaction product of para amido diphenyl ether and acetone, and equivalents and analogues thereof. For example, an amino diphenyl ether may be condensed with other ketones such as acetophenone, benzophenone, benzoyl acetone, cinnamone, hydroxy benzal acetone, di-benzal acetone, benzoin, etc. but preferably with aliphatic ketones such as acetone, acetyl acetone, mesityl oxide, phorone, diacetone alcohol, hydroxy acetone, etc. Any one of the above mentioned class of ketone-amino diaryl ether condensation products may be incorporated into rubber or a rubber composition with beneficial effects on its age-resisting properties, and flex cracking resistance thereof.

The preferred class of materials which comprise amino diaryl ether-ketone condensation products are obtainable by heating the reactants in the presence of a suitable catalyst or condensing agent. Where convenient or desirable other methods well known to those skilled in the art may be employed.

The following are to be understood as illustrative of the invention and not limitative of the scope thereof.

Example I 67 parts by weight of para amido diphenyl ether and 116 parts by weight of acetone were placed in a suitable reactor and heated in the presence of a suitable catalyst, for example, 2 parts by weight of iodine, for thirty hours at substantially refluxing temperature. At the end of this period the water produced by the reaction and any unreacted acetone and para amido diphenyl ether were removed, preferably by distillation. The residue comprising the preferred reaction product was incorporated in the usual manner into a tread stock comprising

|  | Parts |
|---|---|
| Smoked sheet rubber | 100 |
| Carbon black | 50 |
| Zinc oxide | 5 |
| Pine tar | 2 |
| Stearic acid | 3 |
| Benzothiazyl thiobenzoate | 0.8 |
| Diphenyl guanidine | 0.2 |
| Reaction product of para amido diphenyl ether and acetone | 1.0 |

The rubber stock thus compounded was vulcanized in the well known manner and portions of the vulcanized product were then artificially aged by heating in a bomb for 120 hours at a temperature of 70° C. and under a pressure of 300 pounds of oxygen per square inch. A comparison between the aged and unaged cured rubber product is given in Table I.

Table I

| Cure | | Hrs. aged | Modulus of elasticity in lbs./in.² at elongation of 200% | Tensile at break in lbs./in.² | Ult. elong., percent |
| Mins. | Lbs. steam pressure | | | | |
|---|---|---|---|---|---|
| 60 | 30 | 0 | 1060 | 4160 | 590 |
| 60 | 30 | 120 | 835 | 1760 | 400 |
| 75 | 30 | 0 | 1150 | 3890 | 540 |
| 75 | 30 | 120 | 940 | 1755 | 370 |
| 90 | 30 | 0 | 1240 | 4005 | 535 |
| 90 | 30 | 120 | 970 | 1940 | 370 |

The data set forth in Table I show that the preferred class of materials, for example, the reaction product of acetone and para amido diphenyl ether comprise an important group of antioxidants. The cured rubber product containing the reaction product of acetone and para amido diphenyl ether was also found on testing in the manner hereinbefore set forth to be markedly superior in flex cracking resistance over a similar stock containing none of the preferred class of materials.

Example II 40 parts by weight of 4 amino 4' methyl diphenyl ether and 150 parts by weight of acetone were placed in a suitable reactor and heated in the presence of a suitable catalyst, for example, 2 parts by weight of iodine, for forty-eight hours at substantially refluxing temperature. At the end of this period the water produced by the reaction and any unreacted acetone were removed, preferably by distillation. The residue was taken up in benzene and any unreacted 4 amino 4' methyl diphenyl ether removed by precipitating with sulphuric acid. After removal of the benzene the residue comprising the preferred reaction product was incorporated in the usual manner in a tread stock comprising:

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Benzothiazyl thiobenzoate | 0.8 |
| Diphenyl guanidine | 0.2 |
| Reaction product of acetone and 4 amino 4' methyl diphenyl ether | 1.0 |

The rubber stock thus compounded was vulcanized in the well known manner and portions of the vulcanized product were then artificially aged by heating in a bomb for 120 hours at a temperature of 70° C. and under a pressure of 300 pounds of oxygen per square inch. A comparison between the aged and unaged cured rubber product is given in Table II.

Table II

| Cure | | Hrs. aged | Modulus of elasticity in lbs./in.² at elongation of 200% | Tensile at break in lbs./in.² | Ult. elong., percent |
| Mins. | Lbs. steam pressure | | | | |
|---|---|---|---|---|---|
| 60 | 30 | 0 | 1140 | 4400 | 540 |
| 60 | 30 | 120 | 1050 | 2160 | 390 |
| 75 | 30 | 0 | 1255 | 4275 | 525 |
| 75 | 30 | 120 | 1070 | 1940 | 360 |
| 90 | 30 | 0 | 1303 | 4135 | 505 |
| 90 | 30 | 120 | 1095 | 1802 | 325 |

The data set forth in Table II show the typical desirable aging qualities of the preferred class of materials. The cured rubber product containing the reaction product of acetone and 4 amino 4' methyl diphenyl ether was also found on testing in the manner hereinbefore set forth to be markedly superior in flex cracking resistance over a similar stock containing none of the preferred class of materials.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a product obtained by reacting an amino diaryl ether with a ketone in which the ketonic carbon atom is directly attached to two disjoined radicals selected from the aliphatic and aromatic series, which is accompanied by the elimination of water.

2. The method of preserving rubber which comprises treating rubber with a product obtained by reacting an amino diaryl ether with an aliphatic ketone which is accompanied by the elimination of water.

3. The method of preserving rubber which comprises treating rubber with a product obtained by reacting an amino diaryl ether with an aliphatic ketone containing more than two but less than eleven carbon atoms which is accompanied by the elimination of water.

4. The method of preserving rubber which comprises treating rubber with a product obtained by reacting a primary amino diaryl ether with an aliphatic ketone which is accompanied by the elimination of water.

5. The method of preserving rubber which comprises treating rubber with a product obtained by reacting a primary amino diaryl ether with an aliphatic ketone which is accompanied by the elimination of water, said primary amino group being in the para position.

6. The method of preserving rubber which comprises treating rubber with a product obtained by reacting an amino diphenyl ether having a nuclear alkyl substitutuent with an aliphatic ketone which is accompanied by the elimination of water.

7. The method of preserving rubber which comprises treating rubber with a product obtained by reacting a diaryl ether containing a primary amino group in a para position said aryl radicals consisting of aryl hydrocarbon radicals selected from the benzene and naphthalene series with one member of a group consisting in acetone, methyl ethyl ketone, diacetone alcohol, mesityl oxide, phorone, diisopropyl ketone and isobutyl methyl ketone which is accompanied by the elimination of water.

8. The method of preserving rubber which comprises treating rubber with a product obtained by reacting para amido diphenyl ether with acetone which is accompanied by the elimination of water.

9. The method of preserving rubber which comprises treating rubber with a product obtained by reacting 4 amino 4' methyl diphenyl ether with acetone which is accompanied by the elimination of water.

10. The method of preserving rubber which comprises treating rubber with a product obtained by reacting 4 amino phenyl alpha naphthyl ether with acetone which is accompanied by the elimination of water.

11. The rubber composition comprising rubber, sulfur and a product obtained by reacting an amino diaryl ether with an aliphatic ketone which is accompanied by the elimination of water.

12. The rubber composition comprising rubber, sulfur and a product obtained by reacting a primary amino diaryl ether with an aliphatic ketone which is accompanied by the elimination of water, said primary amino group being in the para position.

13. The rubber composition comprising rubber, sulfur and a product obtained by reacting an amino diaryl ether having a nuclear alkyl substituent with an aliphatic ketone which is accompanied by the elimination of water.

14. The rubber composition comprising rubber, sulfur and a product obtained by reacting a primary amino diaryl ether with acetone which is accompanied by the elimination of water, said primary amino group being in the para position.

JOSEPH R. INGRAM.